(12) United States Patent
Lal

(10) Patent No.: US 9,015,627 B2
(45) Date of Patent: Apr. 21, 2015

(54) USER INTERFACE FOR DIGITAL PHOTO FRAME

(75) Inventor: Rajesh Lal, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 829 days.

(21) Appl. No.: 12/414,368

(22) Filed: Mar. 30, 2009

(65) Prior Publication Data

US 2010/0251181 A1   Sep. 30, 2010

(51) Int. Cl.
G06F 3/048 (2013.01)
G06F 3/0488 (2013.01)
H04N 1/00 (2006.01)
G06F 3/0482 (2013.01)

(52) U.S. Cl.
CPC .............. *G06F 3/0488* (2013.01); *G06F 3/048* (2013.01); *G06F 3/04883* (2013.01); *G06F 3/0482* (2013.01); *G09G 2380/16* (2013.01); *H04N 1/00347* (2013.01); *H04N 1/00411* (2013.01); *H04N 1/0044* (2013.01); *H04N 2201/0089* (2013.01); *H04N 2201/0087* (2013.01)

(58) Field of Classification Search
CPC .. G06F 3/0482; G06F 3/04883; G06F 3/0488
USPC .............................. 715/834; 345/173; 40/700
See application file for complete search history.

(56) References Cited

U.S. PATENT DOCUMENTS

| | | | | |
|---|---|---|---|---|
| 6,310,648 B1 * | 10/2001 | Miller et al. | ............. | 348/333.05 |
| 6,710,805 B1 * | 3/2004 | Gennetten et al. | ....... | 348/333.02 |
| 6,867,763 B2 * | 3/2005 | Griffin et al. | ................. | 345/168 |
| 7,036,091 B1 * | 4/2006 | Nguyen | ......................... | 715/834 |
| 7,516,419 B2 * | 4/2009 | Petro et al. | ..................... | 715/834 |
| 7,966,575 B1 * | 6/2011 | Jetha et al. | ..................... | 715/817 |
| 7,992,102 B1 * | 8/2011 | De Angelo | ..................... | 715/834 |
| 2003/0142081 A1 | 7/2003 | Iizuka et al. | | |
| 2004/0212617 A1 * | 10/2004 | Fitzmaurice et al. | ......... | 345/440 |
| 2005/0057578 A1 | 3/2005 | Chen et al. | | |
| 2005/0140661 A1 * | 6/2005 | Collins | ..................... | 345/173 |
| 2005/0162555 A1 | 7/2005 | Lan et al. | | |
| 2006/0072174 A1 * | 4/2006 | Koike et al. | ................... | 358/537 |
| 2006/0095865 A1 * | 5/2006 | Rostom | ......................... | 715/810 |
| 2006/0164389 A1 * | 7/2006 | Ringot | ........................... | 345/157 |
| 2006/0170669 A1 * | 8/2006 | Walker et al. | ................. | 345/418 |
| 2007/0136681 A1 | 6/2007 | Miller | | |
| 2007/0271528 A1 * | 11/2007 | Park et al. | ..................... | 715/810 |
| 2008/0001933 A1 | 1/2008 | Chen et al. | | |
| 2008/0007481 A1 | 1/2008 | Chen et al. | | |
| 2008/0030478 A1 | 2/2008 | Li et al. | | |
| 2008/0055283 A1 | 3/2008 | Peng | | |
| 2008/0059913 A1 | 3/2008 | Burter | | |
| 2008/0062469 A1 | 3/2008 | Silverbrook | | |

(Continued)

FOREIGN PATENT DOCUMENTS

| | | |
|---|---|---|
| EP | 1536315 A1 | 6/2005 |
| WO | 03/062978 A2 | 7/2003 |
| WO | 2004/015628 A2 | 2/2004 |

*Primary Examiner* — Anil Bhargava
(74) *Attorney, Agent, or Firm* — Sony Corporation

(57) ABSTRACT

A digital picture frame has a frame bounding a touch screen that presents a user interface having first and second arcs of selector elements. The first arc of selector elements is manipulable to establish an input genre root, and the second arc is manipulable to select an input branching from a genre root selected using an element in the first group. The arcs are rotatable to reveal previously unpresented selector elements when a person moves a hand along the respective arc.

9 Claims, 3 Drawing Sheets

(56) References Cited

U.S. PATENT DOCUMENTS

| | | |
|---|---|---|
| 2008/0079654 A1 | 4/2008 | Silverbrook |
| 2008/0100596 A1 | 5/2008 | Peng |
| 2008/0100632 A1 | 5/2008 | Peng |
| 2008/0172695 A1* | 7/2008 | Migos et al. .................... 725/45 |
| 2008/0204402 A1* | 8/2008 | Hirata et al. .................. 345/156 |
| 2008/0236014 A1 | 10/2008 | Chao et al. |
| 2008/0270949 A1* | 10/2008 | Liang ........................... 715/859 |
| 2008/0273126 A1 | 11/2008 | Chang |
| 2008/0297438 A1 | 12/2008 | Lin |
| 2008/0301993 A1 | 12/2008 | Lian et al. |
| 2009/0037813 A1* | 2/2009 | Newman et al. ............... 715/702 |
| 2009/0040356 A1 | 2/2009 | Shih et al. |
| 2009/0059052 A1 | 3/2009 | Lin et al. |
| 2009/0085911 A1* | 4/2009 | Fitzmaurice et al. ......... 345/419 |
| 2009/0195510 A1* | 8/2009 | Saunders ...................... 345/169 |
| 2009/0256947 A1* | 10/2009 | Ciurea et al. ............. 348/333.12 |
| 2009/0327964 A1* | 12/2009 | Mouilleseaux et al. ...... 715/834 |
| 2010/0188268 A1* | 7/2010 | Grignani et al. ................. 341/22 |
| 2010/0192102 A1* | 7/2010 | Chmielewski et al. ....... 715/834 |
| 2010/0214243 A1* | 8/2010 | Birnbaum et al. ............. 345/173 |
| 2010/0229130 A1* | 9/2010 | Edge et al. .................... 715/863 |
| 2010/0287154 A1* | 11/2010 | Tee et al. ....................... 707/708 |
| 2011/0047014 A1* | 2/2011 | De Angelo .................. 705/14.4 |

* cited by examiner

USER INTERFACE FOR DIGITAL PHOTO FRAME

FIELD OF THE INVENTION

The present invention relates generally to user interfaces for digital photo frames.

BACKGROUND OF THE INVENTION

Digital photo frames have been provided which can present, on a computer-controlled display, digital photographs. These frames mimic in size and shape traditional photo frames, but have the advantages of allowing users to rapidly view multiple photos in succession without flipping through a hard copy album, and allowing users to quickly and easily change the image that is presented in the frame without having to remove the back of the frame and swap hard copy photos.

To facilitate image browsing and selection, digital photo frames may employ touch screens on which user interfaces may be presented. Existing user interfaces can be obtrusive to viewing the photo and may not be conveniently configured for the user.

SUMMARY OF THE INVENTION

As understood herein, users typically grasp digital photo frames in the same manner as traditional frames, that is, along the left and right edges with the fingers behind the frame and the thumbs in front.

Accordingly, in one embodiments a digital photo frame includes a frame, a touch screen bordered by the frame, and a computer readable storage medium bearing digital images. A processor causes a user-selected image from the medium to be presented on the touch screen. The processor also receives touch signals from the touch screen. The processor causes the touch screen to present a user interface (UI) that may include at least first and second partially arcuate rings. Each ring bears plural discreet selector elements, and each selector element is manipulable by a person to input a respective selection represented by the selector element. At least one menu navigation arrow is juxtaposed with at least one of the rings and is manipulable by a person to navigate through a menu of selections selectable using respective selector elements.

In some embodiments, each selector element on the first ring represents a root selection and each selector element on the second ring represents a branch of a selected root from the first ring. A ring can be caused to appear to rotate when a user moves a finger along the ring to expose selector elements previously not presented on the touch screen.

In one implementation of the UI, the frame defines left and right edges, each ring defines a straight boundary and an arcuate selector element segment extending from a first end of the respective boundary to a second end of the respective boundary, and the boundaries of the first and second rings are respectively juxtaposed with and parallel to the left and right edges of the frame. With this UI a person can conveniently manipulate the selector elements using only respective thumbs of the person.

In another implementation of the UI the first ring defines a straight boundary and a first arcuate selector element segment extending from a first end of the boundary to a second end of the boundary, the second ring defines a second arcuate selector element segment positioned against the first selector element segment parallel thereto, and the boundary is juxtaposed with and parallel to one of the left or right edges of the frame. A person can conveniently manipulate the selector elements using only a left or right thumb of the person.

In yet another UI implementation each ring defines a straight boundary and an arcuate selector element segment extending from a first end of the respective boundary to a second end of the respective boundary and the boundaries of the first and second rings are displayed on a centerline of the digital picture frame that is midway between the left and right edges. Or, the arcuate segments can be reversed, i.e., midpoints of the selector element segments can be substantially tangential to each other at a centerline of the digital picture frame that is midway between the left and right edges.

While contemplated in some intended environments for use with digital photo frames, the UI may be used for other types of digital frames including mobile devices, book readers, and any touch screen device with a pictorial or textual display.

In another aspect, a touch screen is controlled by processor to present a user interface (UI). The UI includes at least two groups of selector elements with each group arranged in a respective arc. A first group of selector elements can be manipulated to establish an input genre root, while a second group of selector elements can be manipulated to select an input branching from a genre root selected using an element in the first group. At least one arc may be rotatable to reveal previously unpresented selector elements when a person moves a hand along the respective arc.

In still another aspect, an apparatus has a frame, a touch screen bordered by the frame, and a computer readable storage medium bearing digital images. A processor causes at least one image from the medium to be presented on the touch screen. The processor also receives touch signals from the touch screen, with the processor causing the touch screen to present a user interface (UI) that has at least two groups of selector elements. Each group is arranged in a respective arc. A first group of selector elements can be manipulated to establish an input genre root. In contrast, a second group of selector elements can be manipulated to select an input branching from a genre root selected using an element in the first group. At least one arc reveals previously unpresented selector elements when a person moves a hand along the respective arc.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
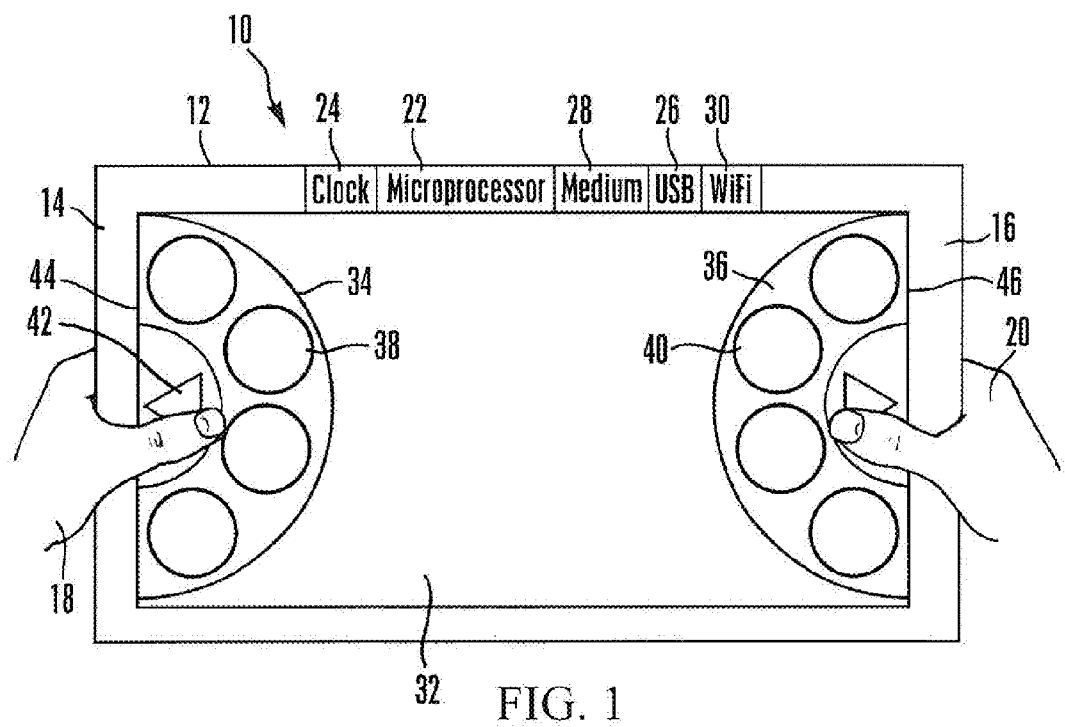
FIG. 1 is a front elevational view of an example digital picture frame, showing internal components schematically.

Referring initially to FIG. 1, a digital picture frame 10 includes a hollow frame 12 that may be rectilinear as shown, defining left and right edges 14, 16. The frame 12 may assume other shapes, e.g., ovular with left and right ends. The digital picture frame 10 is sized as a picture frame so that it is substantially flat and can be grasped by a user's left and right hands 18, 20 as shown along the left and right edges 14, 16, with the user's fingers in back and the thumbs in front as shown.

In the example embodiment shown in FIG. 1, the digital picture frame 10 can hold a processor 22 that receives time input from a clock 24, as well as still or moving image data input from various sources such as but not limited to a universal serial bus (USB) interface 26 and/or a computer readable storage medium 28 such as but not limited to solid state storage or disk-based storage. In some embodiments the medium 28 may be removable, e.g., the medium 28 may be implemented by a memory card. In any case, photos from a digital camera, for example, may be conveyed to the medium 28 directly by engaging the medium 28 with the camera and loading photos onto the medium 28, then disengaging the medium 28 from the camera and sliding it into a receptacle of the digital picture frame 10. Or, the photos may be transferred from a camera or other source of photos through the USB interface 26 onto the medium 28 in the digital picture frame 10.

Also, the processor 22 may receive input from a wireless or wired network interface 30 such as but not limited to a WiFi interface. Images received from the network interface 30 may also be displayed in addition to images from cameras as set forth further below.

A touch screen 32 is bounded by the frame 12 as shown. The touch screen 32 is controlled by the processor 22 to present images from the medium 28 and/or USB interface 26 and/or network interface 30 or other source communicating with the processor 22. Also, user input signals are generated by the touch screen 32 when a user tactiley manipulates the below-described user interfaces (UI), and these signals are sent to the processor 22, which may execute logic stored on the medium 28 to undertake the UI activities and respond to UI commands as discussed below.

With more specificity, the processor 22 can cause the touch screen 32 to present a UI that may include at least first and second partially arcuate rings 34, 36. The rings may be circular as shown. In the embodiment shown, the rings 34, 36 are visible; in other embodiments, only the arcuately-arranged selector elements may be visible.

Thus, each ring bears plural discreet selector elements 38, 40, and each selector element 38, 40 is manipulable by a person to input a respective selection represented by the selector element. In the embodiment shown in FIGS. 1 and 2, a respective menu navigation arrow 42 is juxtaposed with each of the rings and is manipulable by a person to navigate through a menu of selections selectable using respective selector elements. For example, touching the left arrow 42 can cause the below-described tree-like menu to traverse up the tree, while touching the right arrow 42 can cause a downward traversal.

Figure 2:
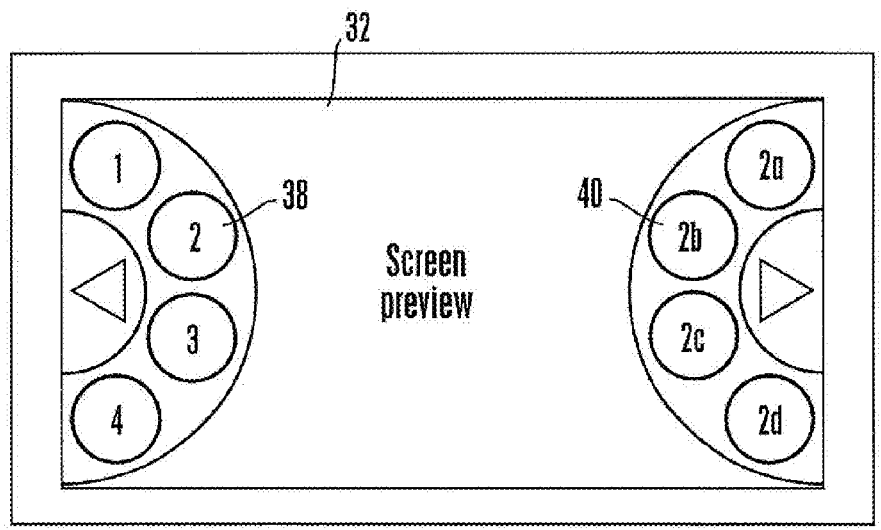
FIG. 2 is a front elevational view of the digital picture frame of FIG. 1, illustrating the root and branch selection provided by the user interface (UI)

In some embodiments, each selector element 38 on the first ring represents a root selection and each selector element 40 on the second ring represents a branch of a selected root from the first ring. Thus and now referring to FIG. 2, if genre #2 is selected by manipulating the "2" element on the left ring, then the selector elements 40 on the right ring represent elements in that genre that are available for display (and, thus, the selector elements 40 in FIG. 2 are labeled "2a", "2b", and so on for clarity of disclosure).

As an example, assume that the arrows 42 have been manipulated to traverse to the root of the tree. This may be regarded as a "list of genres" root. Further manipulation of the arrows 42 may cause selector elements 38 in the left ring to respectively represent "albums", "Wi-Fi", and "clock".

Assume "albums" is selected. Selector elements 38 in the left ring may then represent each album available with photos for presentation, e.g., "Album 1", "album 2", and so on. If "album 1" is selected then the selector elements 40 of the right ring may indicate respective photos in that album, and a user may manipulate the selector element 40 corresponding to a photo from the selected album desired to be presented on the touch screen 32. In such a case, a preview of the photo may be superimposed on the UI, or the UI may be superimposed on the selected photo. When the UI times out or upon user command, the UI can disappear until such time as, e.g., the user again touches the screen 32 to indicate a desire to invoke the UI.

If the user navigates to "WiFi", selector elements 40 in the right ring can be correlated to respective WiFi channel numbers. Then again, if the user navigates to "clock", selector elements in the right ring can correspond to "set hour", "set minute", "set second" for digital picture frames having a digital clock also displayed, and then the arrow elements 42 can be manipulated to appropriately set the time.

While four selector elements per ring are shown, each ring may virtually include more selector elements than are displayed. Under these circumstances, to display hidden selector elements, a ring (or equivalently the associated arc of selector elements) can be caused to appear to rotate when a user moves a finger along the ring to expose selector elements previously not presented on the touch screen.

As shown in FIGS. 1 and 2, each ring 34, 36 defines a respective straight boundary 44, 46 in addition to the arcuate selector element segment, which extends from end to end on the straight boundary. In the embodiment shown in FIGS. 1 and 2, the boundaries 44, 46 are respectively juxtaposed with and parallel to the left and right edges 14, 16 of the frame. Indeed, the boundaries 44, 46 lie along the left and right edges of the touch screen 32 as shown. With this UI a person can conveniently manipulate the selector elements using only respective thumbs of the person.

Figure 3:
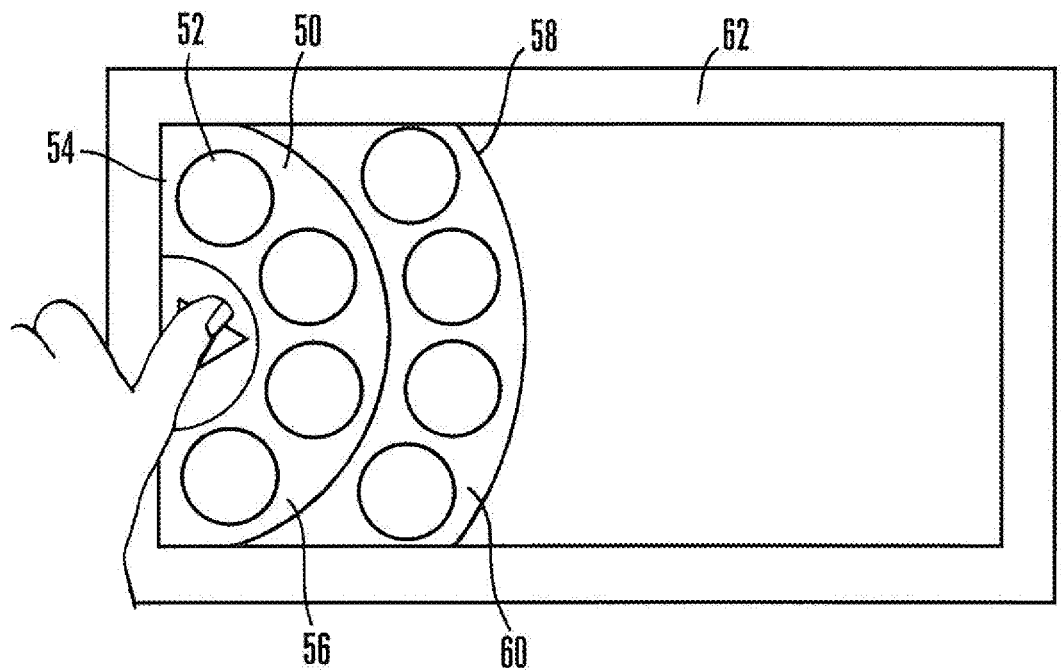
FIG. 3 is a front elevational view of an alternate example digital picture frame.
Figure 4:
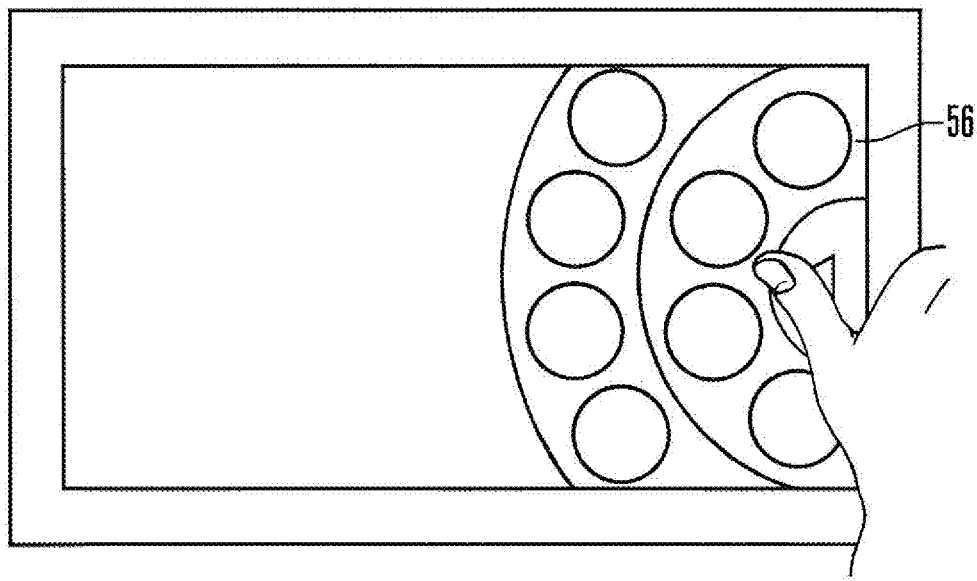
FIG. 4 is a front elevational view of another alternate example digital picture frame.

In another implementation of the UI and now referring to FIGS. 3 and 4, a first ring 50 of selector elements 52 defines a straight boundary 54 and a first arcuate selector element segment 56 extending from end to end of the boundary. In this implementation, the second ring 58 defines a second arcuate selector element segment 60 that is positioned against the first selector element segment 56, parallel thereto. The straight boundary 54 is juxtaposed with and parallel to the left edge of a digital picture frame 62 (FIG. 3) or to the right edge of the frame (FIG. 4). With this arrangement, a person can conveniently manipulate the selector elements using only a left or right thumb of the person.

Figure 5:
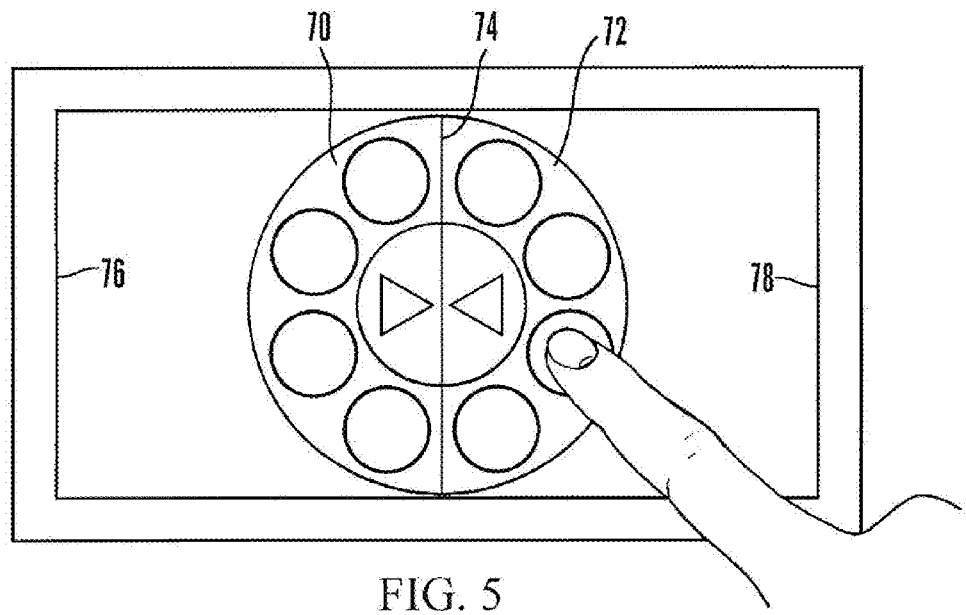
FIG. 5 is a front elevational view of yet another alternate example digital picture frame.
Figure 6:
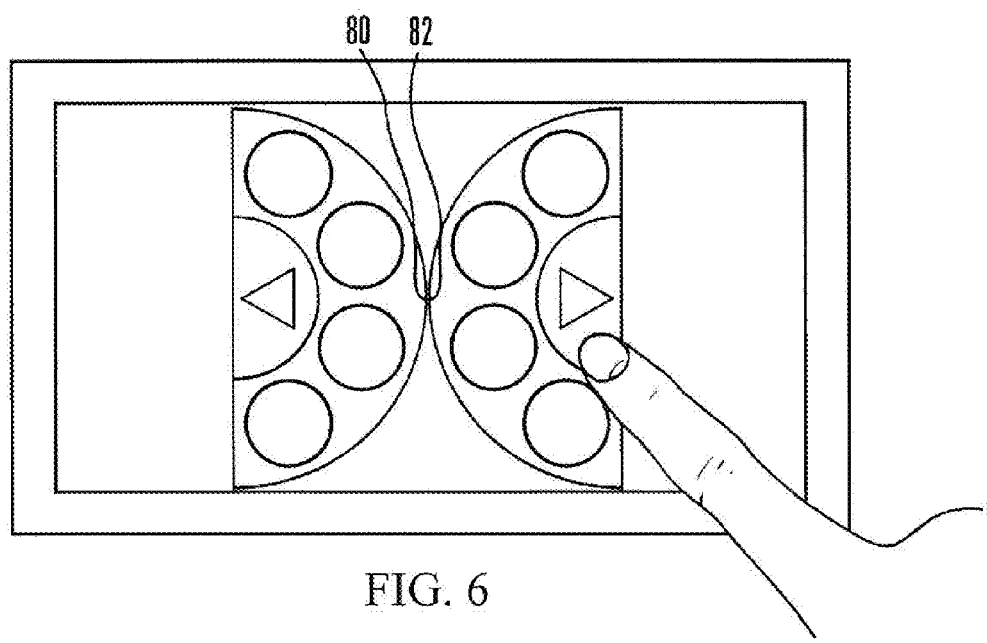
FIG. 6 is a front elevational view of still another alternate example digital picture frame.

FIGS. 5 and 6 show that the UI may be distanced from the left and right edges of the frame and be disposed in the middle of the touch screen for single finger manipulation if desired. With more specificity, starting with FIG. 5 each of two rings 70, 72 that function as described above can define a straight boundary 74 and an arcuate selector element segment extending from a first end of the respective boundary to a second end of the respective boundary, and the boundaries of the first and second rings are displayed on a centerline of the digital picture frame that is midway between the left and right edges 76, 78. In other words, the each semi-circular ring faces the other to establish a complete circle, with selector elements in the right semicircle functioning as the selector elements 40 in FIGS. 1 and 2 and selector elements in the left semicircle functioning as the selector elements 38. Or, as shown in FIG.

6 the arcuate segments can be reversed, i.e., midpoints 80, 82 of the selector element segments can be substantially tangential to each other at a centerline of the digital picture frame that is midway between the left and right edges of the frame.

If desired, in the setup mode the user may be given "UI configuration" options which allows the user to select which one of the above-described UIs to select.

It may now be appreciated that present principles provide an unobtrusive UI that can be presented simultaneously with a photo for preview, and in some embodiments is well suited for two thumb-only UI interaction. Present principles provide an easy way to browse options in a clean and elegant UI design.

While the particular USER INTERFACE FOR DIGITAL PHOTO FRAME is herein shown and described in detail, it is to be understood that the subject matter which is encompassed by the present invention is limited only by the claims.

What is claimed is:

1. A digital photo frame comprising:
   a storage medium to store a plurality of digital images; and
   a processor to receive an input from a user interface displayed on a touch screen, wherein the user interface (UI) comprises:
      a first partially arcuate ring comprising a first plurality of discreet selector elements, wherein each of the first plurality of discreet selector elements is manipulable to display a second plurality of discreet selector elements in a second partially arcuate ring, wherein selection of at least one of the second plurality of discreet selector elements corresponds to the input; and
      at least one menu navigation arrow disposed within at least one of the rings and manipulable to navigate through a menu of selections selectable using respective selector elements, wherein the frame defines left and right edges, each ring defines a straight boundary and an arcuate selector element segment extending from a first end of the respective boundary to a second end of the respective boundary, and the boundaries of the first and second rings are respectively adjacent to and parallel to the left and right edges of the frame with the arcuate selector element segments between the boundaries, such that the arcuate selector element segments open away from each other, wherein the touch screen displays, in response to the input, at least one of the plurality of digital images superimposed by the UI.

2. The digital photo frame of claim 1, wherein the first plurality of discreet selector elements on the first partially arcuate ring represents a root selection and the second plurality of discreet selector elements on the second partially arcuate ring represents a branch of the selected root from the first partially arcuate ring.

3. The digital photo frame of claim 1, wherein both the first partially arcuate ring and the second partially arcuate ring are caused to appear to rotate when a user moves a finger along the first partially arcuate ring and the second partially arcuate ring to expose the first plurality of discreet selector elements and second plurality of discreet selector elements respectively, previously not presented on the touch screen.

4. The digital photo frame of claim 1, wherein the frame defines left and right edges, wherein each of the first partially arcuate ring and the second partially arcuate ring defines the straight boundary and the arcuate selector element segment extending from the first end of the respective boundary to the second end of the respective boundary, and midpoints of segments of the first plurality of discreet selector elements and the second plurality of discreet selector elements are substantially tangential to each other at a centerline of the frame that is midway between the left and right edges.

5. A touch screen controlled by processor to present a user interface (UI) comprising:
   at least two groups of discreet selector elements, each group arranged in a respective arc, a first group of discreet selector elements being manipulable to establish an input genre root, a second group of discreet selector elements being manipulable to select an input branching from a genre root selected using an element in the first group, wherein the touch screen defines left and right edges, each group is associated with a straight boundary and an arcuate selector element segment extending from a first end of the respective boundary to a second end of the respective boundary, and midpoints of the selector element segments are substantially tangential to each other at a centerline of the touch screen that is midway between the left and right edges, wherein the touch screen displays, in response to the input, at least one of a plurality of digital images superimposed by the UI; and
   at least one menu navigation arrow disposed within at least one of the groups and manipulable by a person to navigate through a menu of selections selectable using respective discreet selector elements.

6. The touch screen of claim 5, wherein the touch screen is bounded by a digital picture frame.

7. The touch screen of claim 6, wherein the frame defines left and right edges, each group is associated with a straight boundary and an arcuate selector element segment extending from a first end of the respective boundary to a second end of the respective boundary, and the boundaries of the first and second groups are respectively adjacent to and parallel to the left and right edges of the frame.

8. An apparatus comprising:
   a storage medium to store a plurality of digital images; and
   a processor to receive an input from a user interface displayed on a touch screen, wherein the user interface (UI) comprises:
      at least two groups of discreet selector elements, each group arranged in a respective arc, wherein the touch screen defines left and right edges and the arc of each group terminates in opposed ends distanced from each other and defining a respective line there between, such that the arc of each group extends from a first end of the respective arc to a second end of the respective arc, and the lines defined between the ends of each arc respectively face and are parallel to the respective left and right edges of the touch screen, the lines being laterally separated from each other by at least the arcs of the discreet selector elements, wherein the touch screen displays, in response to the input, at least one of the plurality of digital images superimposed by the UI; and
      at least one menu navigation arrow disposed within at least one of the groups and manipulable to navigate through a menu of selections selectable using respective discreet selector elements.

9. The apparatus of claim 8, wherein midpoints of the arcs are substantially tangential to each other at a centerline of the touch screen that is midway between the left and right edges.

* * * * *